United States Patent
Queen, Jr.

[11] 3,896,902
[45] July 29, 1975

[54] PLUG FOR DRIVE SHAFT WITH INTERNAL DRIVE SPLINE

[75] Inventor: Charles C. Queen, Jr., Cookeville, Tenn.

[73] Assignee: The United States of America as represented by the Secretary of the Air Force, Washington, D.C.

[22] Filed: May 30, 1974

[21] Appl. No.: 474,564

[52] U.S. Cl.............. 184/88 R; 85/3 R; 277/188; 277/189
[51] Int. Cl............................................ F16n 31/00
[58] Field of Search............ 184/88 R, 88 A, 80, 86, 184/52, 55 A; 277/1, 9, 12, 32, 101, 188, 189; 220/24, 24.5, 55 E, 45, 25, DIG. 4; 70/371; 285/209, 210, 178, 10, 11, 94, 109, 258, 344, 351, DIG. 11, DIG. 19; 85/3 R, 3 K, 3 S, 1 JP; 292/327, DIG. 58

[56] References Cited
UNITED STATES PATENTS
| | | | |
|---|---|---|---|
| 1,785,709 | 12/1930 | Campau | 85/3 R X |
| 2,793,784 | 5/1957 | McInnes | 220/25 |
| 2,914,344 | 11/1959 | Anthes | 285/351 X |
| 2,925,148 | 2/1960 | Mosher | 184/55 A |
| 2,938,646 | 5/1960 | Banker et al. | 220/24.5 |
| 3,333,724 | 8/1967 | Croft et al. | 220/24.5 |

Primary Examiner—Richard C. Pinkham
Assistant Examiner—Arnold W. Kramer
Attorney, Agent, or Firm—Joseph E. Rusz; Richard J. Killoren

[57] ABSTRACT

A plug assembly for a shaft with an internal lubricated drive spline having a plug member with an O-ring for sealing the plug in the shaft cavity. The plug member has an off-center hole therein for receiving a bolt with an eccentric head. The bolt head passes through the spline with the bolt in one position. The bolt can be turned so that the head engages the inner edge of the spline to retain the plug in place when lock nuts on the bolt are turned down against the outer end of the plug member. An O-ring seal is provided between the bolt and the plug member.

1 Claim, 2 Drawing Figures

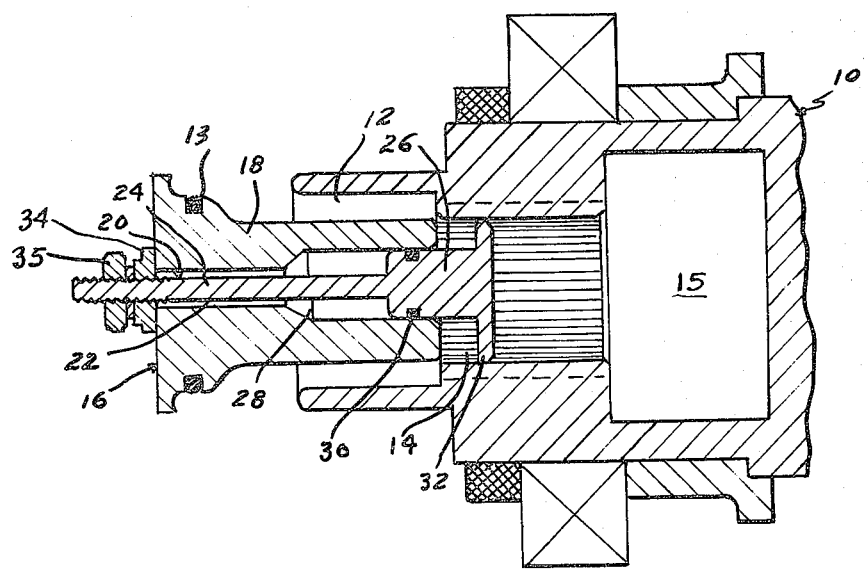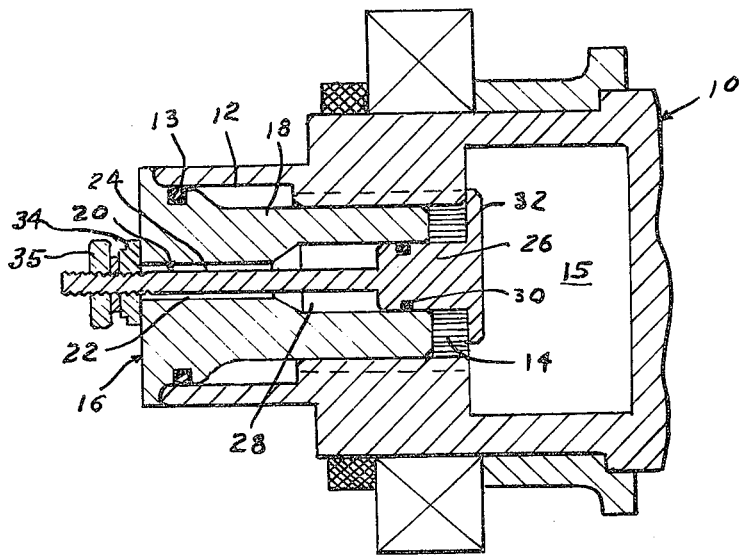

PLUG FOR DRIVE SHAFT WITH INTERNAL DRIVE SPLINE

The invention described herein may be manufactured and used by or for the Government of the United States for all governmental purposes without the payment of any royalty.

BACKGROUND OF THE INVENTION

In a shaft having an internal lubricated drive spline, it is necessary to seal the spline opening when the mating spline member and seal are removed. In the past, a bolt having a head smaller than the internal diameter of the drive spline was inserted into the opening past the inner edge of the spline. A spline shaft with a seal and an off center square hole was inserted into the drive spline so that the bolt passed through the square hole. This then caused the bolt head to be positioned off center so as to engage the inner edge of the spline. A nut was then threaded onto the bolt to hold the bolt in place.

This system required a two piece plug assembly which is difficult to use due to the difficulty in aligning the bolt with the square hole in the spline shaft. Also, with apparatus having a large cavity beyond the spline, the bolt would tend to fall into the cavity.

BRIEF SUMMARY OF THE INVENTION

According to this invention, a plug is provided which has an outer diameter approximately equal to the inner diameter of the drive spline. An O-ring is provided on the plug to provide a seal. A bolt having an eccentric head is positioned in an off-center hole in the plug so that the head can be turned to engage the inner end of the drive spline. The bolt is held in the plug by threaded nut members which are used to secure the plug in the opening. A seal is provided between the bolt shaft and the plug body.

In the drawing:

FIG. 1 of the drawing shows a partially schematic cross sectional view of a drive member having an internal drive spline with the plug assembly of the invention partially installed in the opening.

FIG. 2 shows the device of FIG. 1 with the plug assembly of the invention in its sealing position within the drive member.

DETAILED DESCRIPTION OF THE INVENTION

Reference is now made to FIGS. 1 and 2 of the drawing which shows a drive member 10 having a central opening 12 with an internal drive spline 14 and a cavity 15 beyond the spline 14. A plug assembly 16, having a plug member 18 and a bolt member 20 is inserted into the opening 12. An O-ring 13 seal is provided in an annular groove in the plug member. The plug member has an off-center cylindrical channel 22 through which the shaft 24 of bolt member 20 passes. The bolt member has an enlarged cylindrical portion 26 which fits into an enlarged cylindrical channel 28. An O-ring seal 30 is provided in an annular groove in portion 26. The bolt member 20 has a large eccentric head member 32 which fits within the spline in one position of the bolt member as shown in FIG. 1 and which may be turned in the plug member to engage the inner edge of the drive spline as shown in FIG. 2. The plug assembly is held in place by means of a pair of lock nuts 34 and 35 which, when turned down against the plug member, hold the head 32 in engagement with the inner edge of the spline.

There is thus provided a plug assembly for a shaft having an internal drive spline which may be more readily installed within the drive shaft than prior art devices.

I claim:

1. In combination with a drive shaft having a central opening; an internal lubricated spline within said opening and spaced from the end of said shaft, with said opening extending beyond the spline to form a central cavity within the shaft; a plug assembly, comprising: a plug member having a portion positioned within the spline of said drive shaft and substantially conforming to the inner diameter of the spline; said plug member having a flange member engaging the end of said shaft, a circumferential groove in the plug member adjacent the flange member near the outer end of said opening; an O-ring in said groove, for sealing said plug within said drive shaft; a cylindrical hole through said plug member; said hole being offset from the center of said plug member; a rotatable bolt member having a cylindrical shaft passing through said hole in said plug member; said bolt member having an off-center head member extending into said central cavity and engaging the inner edge of the spline; a circumferential groove in the portion of said bolt member within said plug; an O-ring in the circumferential groove in said bolt member for sealing the bolt member in said plug; said bolt member having a threaded portion on the end remote from said head member; a pair of lock nuts threaded onto the threaded end of said bolt member for retaining the off-center head member in engagement with the inner edge of the spline, to thereby retain said flange in engagement with the end of said shaft; said off-center head member being adapted to pass through said spline in one angular position of said bolt member in said plug member.

* * * * *